3,402,012
DYEING NICKEL-CONTAINING POLYOLEFIN FIBERS WITH O-ALKYLMERCAPTOAZO DYES
Visvanathan Ramanathan, Basel, Switzerland, assignor to Ciba Limited, Basel, Switzerland, a Swiss company
No Drawing. Filed Mar. 2, 1965, Ser. No. 436,654
Claims priority, application Switzerland, Mar. 5, 1964, 2,848/64
15 Claims. (Cl. 8—42)

---

ABSTRACT OF THE DISCLOSURE

The present invention concerns a process for dyeing or printing nickel-containing polyolefin fibers, which process is characterized by the use of water-insolbule mono-azo-dyes, which are obtained by coupling an aminobenzene having in o-position to the amino group an alkylmercapto, phenylmercapto or phenalkylmercapto group, with a heterocyclic coupling component, especially a pyrazolone. Yellow dyeings of excellent fastness to light, washing and dry-cleaning are obtained.

---

The present invention is based on the observation that valuable dyeings and prints can be obtained on fibrous materials made of or containing nickel-containing polyolefines, such as polyethylene, polypropylene or polyisobutylene, by using water-insoluble dyestuffs of the formula (1)          A—N=N—B in which A represents a benzene radical which contains an alkylmercapto, phenalkylmercapto or phenylmercapto group in ortho-position to the azo linkage and B represents a heterocyclic radical which is bound to the azo linkage through a carbon atom which itself is bound to a heterocyclic nitrogen atom or to an enolizable carbonyl group.

Dyestuffs that are specially suitable for the present process are those of the furmula (1a)

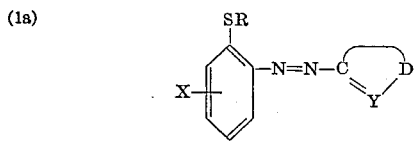

in which X represents a hydrogen or halogen atom or an alkyl or alkoxy group, R represents a benzene radical or an alkyl radical which may be substituted by a carbalkoxy, cyano or phenyl group, D represents the atomic grouping required to complete a 5-membered or 6-membered heterocyclic ring containing only carbon and nitrogen atoms and =Y— represents the linkage =N— or

where $R_1$ represents a hydrogen atom or an alkyl or phenyl group.

The nickel compounds present in the polyolefines to be used in accordance with the process of this invention are preferably nickel salts, for example nickel stearate, nickel acetate or nickel thiocarbamate. The metal-modified polyolefines generally contain such compounds as ultraviolet filters in an amount from about 0.05 to 2%.

Dyestuffs of particular interest in the present process correspond to the formulae (2)

and (3)

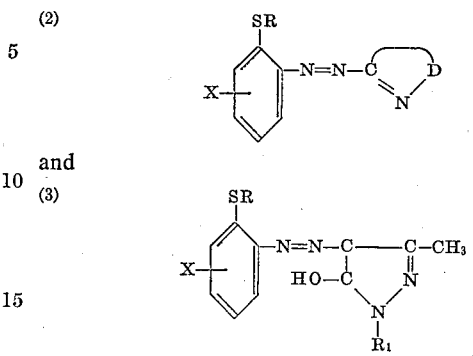

in which R represents a benzene radical or an alkyl radical which may be substituted by a carbalkoxy, cyano or phenyl group, X represents a hydrogen or halogen atom or an alkyl or alkoxy group, D represents the atomic grouping required to complete a 5-membered or 6-membered hetero ring containing only carbon and nitrogen atoms and $R_1$ represents a hydrogen atom or an alkyl or phenyl group.

Of special interest are dyestuffs of Formula 1 in which B represents a radical of the formula

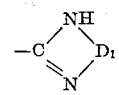

or particularly a radical of the formula

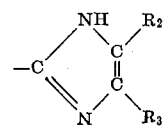

in which $D_1$ represents the atomic grouping required to complete a 5-membered or 6-membered hetero ring containing only carbon and nitrogen atoms and $R_2$ and $R_3$ each represents an alkyl or a phenyl group.

According to a preferred variant of the present invention those dyestuffs of the Formula 3 are especially valuable which correspond to the formula (3a)

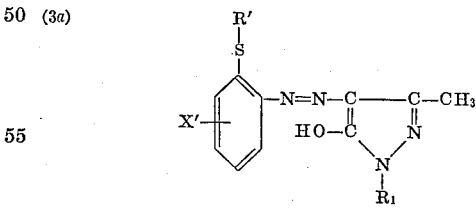

in which $R_1$ represents a hydrogen atom, an alkyl group preferably containing up to 10 carbon atoms, a phenyl group, a halogen-substituted phenyl group or an alkyl-substituted phenyl group, R' represents a methyl or phenyl group and X' represents a hydrogen or halogen atom.

The dyestuffs of the invention may be obtained when an aminobenzene that contains an alkylmercapto or phenylmercapto group in ortho-position to the amino group is coupled with a heterocyclic coupling component.

As examples of suitable ortho-aminoalkyl- and phenylmercaptans there may be mentioned:

1-amino - 2 - methylmercaptobenzene, 1-amino-2-ethylmercaptobenzene, 1-amino-2-phenylmercaptobenzene, 1-amino-2-benzylmercaptobenzene, 1 - amino-2-cyanoethylmercaptobenzene, 1-amino - 2 - carbomethoxymethylmercaptobenzene, 1-amino-2-ethylmercapto-5-nitrobenzene, 1-amino-2-methylmercapto - 5 - chlorobenzene, 1 - amino-2-methylmercapto-5-methoxybenzene, 1-amino - 2 - methylmercapto-5-methylbenzene, 1-amino-2-methylmercapto-4-chlorobenzene, 1 - amino-2-methylmercapto-4-methylbenzene, 1-amino - 2 - methylmercapto-4-methoxybenzene, 1-amino-2-methylmercapto-4:5-dimethylbenzene, 1 - amino-2-methylmercapto-5-trifluoromethylbenzene, 1 - amino-2-methylmercaptobenzene-5-carboxylic acid nitrile, 1-amino-2-n-butylmercapto-5-methylbenzene, 2 - amino-phenylthioglycollic acid phenylamide, 2-amino-2':3':4'-trichlorodiphenylsulfide, 2 - amino - 4 - methyl - diphenylsulfide, 2-amino-5-methyl-diphenylsulfide, 2 - amino-2':5'-dimethyl-4'-chlorodiphenylsulfide, 2 - amino-4'-methyl-diphenylsulfide and 2-amino-diphenylsulfide-2'-carboxylic acid ethyl ester.

As examples of coupling components the following may be mentioned:

4:5-dimethyl-1:3-imidazole, 4:5 - diphenyl-1:3-imidazole, 4-methyl-5-phenyl-1:3-imidazole, benzimidazole, 3-methyl-pyrazolone-5, 1:3-dimethyl-pyrazolone-5, 1-ethyl-3 - methyl-pyrazolone-5, 1-n-butyl-3-methyl-pyrazolone-5, 1-n-hexyl-3-methyl-pyrazolone-5, 1 - n-octyl-3-methyl-pyrazolone-5, 1-phenyl-3-methylpyrazolone-5, 1-(para-chlorophenyl) - 3 - methyl-pyrazolone - 5 and 1-(para-methylphenyl)-3-methyl-pyrazolone-5.

The reaction of the diazo compounds with the coupling components is advantageously carried out in an aqueous and preferably acid medium; as a rule, it is advisable to buffer any excess of mineral acid during the reaction by suitable additives such as sodium acetate, sodium bicarbonate or pyridine. In some cases it may be advantageous to carry out the reaction in an organic solvent, for example in glacial acetic acid, pyridine, dimethylformamide, benzene or acetone.

In dyeing processes the afore-mentioned dyestuffs are advantageously used in a finely dispersed form, in the presence of a dispersant such as soap, sulfite cellulose waste liquor or a synthetic detergent, or of a combination of different wetting agents and dispersants. In general, it is of advantage to convert the dyestuffs prior to the dyeing operation into dyestuff preparations containing a dispersant and finely dispersed dyestuff in such a form that when the dyestuff preparation is diluted with water a fine dispersion is obtained. Such dyestuff preparations can be manufactured in the usual manner, for example by reprecipitating the dyestuff from sulfuric acid and grinding the resulting suspension with sulfite cellulose waste liquor, or by grinding the dyestuff in a highly efficient grinding apparatus in the wet or dry form, with or without addition of a dispersant during the grinding operation.

It is of advantage to dye from an aqueous dispersion at a temperature close to the boiling point of the dyebath, advantageously at the boiling temperature, in the presence of a wetting agent. It is of advantage to render the dyebath weakly acid (optimum pH is about 4 to 7), for example by adding a weakly acid substance such as formic acid, acetic acid or ammonium sulfate. It must be assumed that during the dyeing operation the dyestuff reacts with the metal compound contained in the fiber to form a metal complex.

According to the present invention the dyestuffs described above can be applied not only by dyeing but also by padding or printing. For this purpose, for example, a printing paste may be used that contains the finely dispersed dyestuff and in addition the assistants generally used in printing, such as wetting and thickening agents.

By the process of this invention strong, full dyeings and prints are obtained having excellent properties of fastness especially fastness to light and dry-cleaning, stability towards sublimation in storage and fastness to rubbing.

Unless otherwise indicated, parts and percentages in the following examples are by weight.

Example 1

1 part of an aqueous paste of the dyestuff of the formula

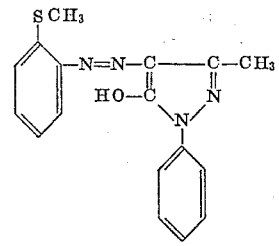

was ground in a roller mill with about 1 part of dried sulfite cellulose waste liquor or of another suitable dispersant to form a fine paste containing 10% of dyestuff.

100 parts of nickel-containing polypropylene were pre-cleaned for ½ hour in a bath containing per 1,000 parts of water, 1 to 2 parts of the sodium salt of N-benzyl-μ-heptadecylbenzimidazole disulfonic acid and 1 part of concentrated aqueous ammonia solution. The material was then transferred to a dyebath containing per 2,000 parts of water, 10 parts of the dyestuff paste prepared as described in the first paragraph above, 3 parts of the sodium salt of N-benzyl-μ-heptadecylbenzimidazole disulfonic acid and 1 part of 40% acetic acid. The whole was heated for 1 hour at the boil. The dyed material was then rinsed and dried. The resulting yellow dyeing was very fast to light and dry-cleaning.

The dyestuff used above could be prepared in the following manner:

A solution of 13.9 parts of 2-aminothioanisole in 200 parts by volume of water and 40 parts by volume of concentrated hydrochloric acid was cooled to 0 to 5° C. and 25 parts by volume of 4 N sodium nitrite solution were added dropwise. The diazo solution thus obtained was added to a solution of 17.4 parts of 1-phenyl-3-methyl-5-pyrazolone in 40 parts by volume of a 30% sodium hydroxide solution and 150 parts by volume of water. After the coupling, the precipitated dyestuff was filtered.

In the following table further dyestuffs are listed that produce on nickel-containing polypropylene fibers the shades indicated which are distinguished by good fastness to light and dry-cleaning:

| Number | Dyestuff | Shade |
|---|---|---|
| 1 | ![structure with SCH₃, N=N, HO-C, C-CH₃, N, phenyl, Cl] | Yellow. |
| 2 | ![structure with SCH₃, N=N-C, N, C, N-C, H, phenyl rings] | Ruby. |

| Number | Dyestuff | Shade |
|---|---|---|
| 3 | 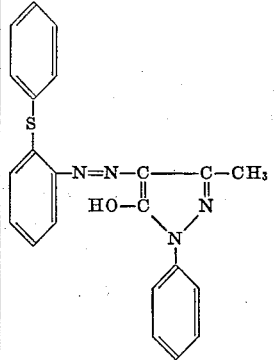 | Yellow. |
| 4 | 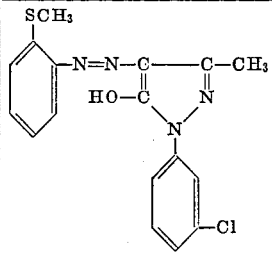 | Yellow. |
| 5 | 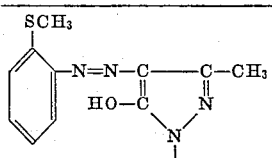 | Yellow. |

The dyestuffs listed above may be obtained by known methods by diazotizing the corresponding amines and coupling the diazo compounds obtained with the appropriate coupling components as described above.

Example 2

1 part of an aqueous paste of the dyestuff of the formula

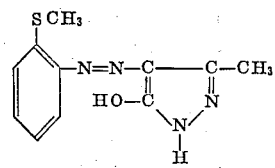

was ground in a roller mill with about 1 part of 1:1'-dinaphthylmethane-2:2'-disulfonic acid to form a fine paste containing 10% of dyestuff. A mixture was then prepared from

|   | Parts |
|---|---|
| This paste | 60 |
| Cold water | 350 |
| Urea | 50 |
| Aqueous 5% sodium alginate solution | 500 |
| Ammonium sulfate | 40 |
|   | 1,000 | and used to pad a nickel-containing polypropylene fabric at 20 to 30° C. The padded fabric was then treated for 30 minutes at about 110° C. in an atmosphere of steam containing acetic acid, rinsed and soaped. The resulting strong yellow shade had very good properties of fastness.

Example 3

1 part of an aqueous paste of the dyestuff of the formula

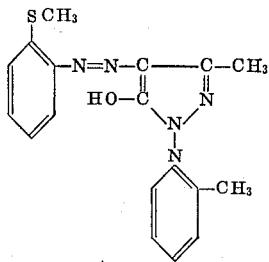

was ground in a roller mill with about 1 part of 1:1'-dinaphthylmethane-2:2'-disulfonic acid to form a fine paste containing 10% of dyestuff. A mixture was then prepared from

|   | Parts |
|---|---|
| This paste | 100 |
| Aqueous 2.5% sodium alginate solution | 200 |
| Water | 700 |
|   | 1,000 | and used to paid a nickel-containing polypropylene fabric at 20 to 30° C. The padded fabric has then treated for 30 minutes at about 110° C. in an atmosphere of steam containing acetic acid, rinsed and soaped. The resulting strong yellow shade had very good properties of fastness.

What is claimed is:

1. A process for coloring fibrous materials made from a nickel-containing polyolefin, wherein there is used a water-insoluble dyestuff of the formula

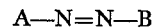

in which A represents a benzene radical which contains a substituent selected from the group consisting of an alkylmercapto, phenalkylmercapto and a phenylmercapto group in ortho-position to the azo bridge and B represents a member selected from the group consisting of imidazole and a benzimidazole bound in the 2-position and a pyrazolone bound in the 4 position.

2. A process as claimed in claim 1, wherein there is used a water-insoluble dyestuff of the formula

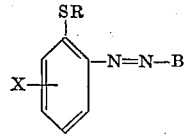

in which X represents a member selected from the group consisting of a hydrogen atom, a halogen atom, an alkyl group and an alkoxy group, R represents a member selected from the group consisting of a benzene radical and an alkyl radical which may be substituted by a carbalkoxy, cyano and phenyl group B represents a member selected from the group consisting of imidazole and a benzimidazole bound in the 2-position and a pyrazolone bound in the 4 position.

3. A process as claimed in claim 1, wherein there is used a dyestuff of the formula given in claim 1 in which B represents a radical of the formula.

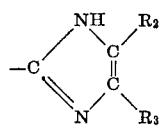

in which $R_2$ and $R_3$ each represents a member selected from the group consisting of an alkyl and a phenyl group.

4. A process as claimed in claim 3, wherein there is used a dyestuff of the formula given in claim 1 in which B represents a radical of the formula.

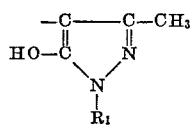

where $R_1$ represents a member selected from the group consisting of a hydrogen atom and an alkyl or phenyl group.

5. A process as claimed in claim 2 wherein there is used a dyestuff of the formula

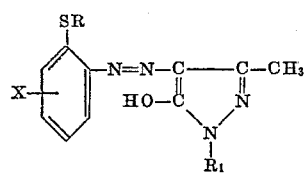

in which R represents a member selected from the group consisting of a benzene radical an an alkyl radical which may be substituted by a member selected from the group consisting of carbalkoxy, cyano and a phenyl group, X represents a member selected from the group consisting of a hydrogen atom, a halogen atom, an alkyl group and an alkoxy group, and $R_1$ represents a member selected from the group consisting of a hydrogen atom, an alkyl and a phenyl group.

6. A process as claimed in claim 5, wherein a dyestuff of the formula

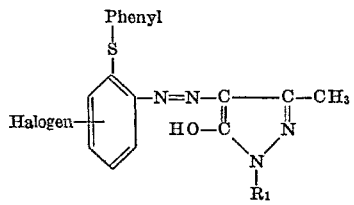

is used in which $R_1$ represents a member selected from the group consisting of a hydrogen atom, or an alkyl group, a phenyl group, a halogen-substituted phenyl group and an alkyl-substituted phenyl group.

7. A process as claimed in claim 5, wherein a dyestuff of the formula

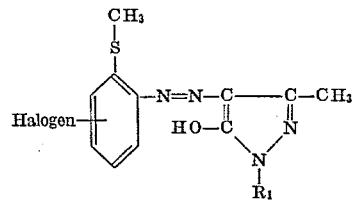

is used in which $R_1$ represents a member selected from the group consisting of hydrogen atom, or an alkyl group, a phenyl group, a halogen-substituted phenyl group and an alkyl-substituted phenyl group.

8. A process as claimed in claim 5, wherein a dyestuff of the formula

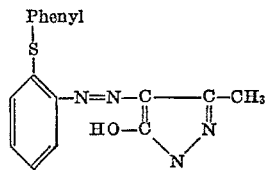

is used in which $R_1$ represents a member selected from the group consisting of a hydrogen atom, an alkyl group, a phenyl group, a halogen-substituted phenyl group and an alkyl-substituted phenyl group.

9. A process as claimed in claim 5, wherein a dyestuff of the formula

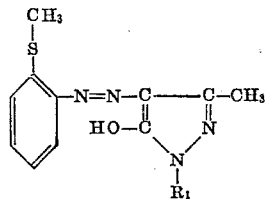

is used in which $R_1$ represents a member selected from the group consisting of hydrogen atom, or an alkyl group, a phenyl group, a halogen-substituted phenyl group an an alkyl-substituted phenyl group.

10. A process as claimed in claim 5, wherein a dyestuff is used in which $R_1$ in the general formula represents an alkyl group containing up to 10 carbon atoms.

11. A process as claimed in claim 1, wherein the material to be colored is made from a polyolefin containing a nickel shaft.

12. A process as claimed in claim 11, wherein the nickel salt is a member of the group consisting of nickel stearate, nickel acetate and nickel thiocarbamate.

13. A process as claimed in claim 1, wherein the nickel-containing polyolefin is a nickel-salt-containing polypropylene.

14. Colored fibrous materials made from a polyolefin obtained by a process claimed in claim 5.

15. The process of dyeing a nickel containing polyolefin fiber by applying to said fiber an aqueous suspension of a 2-alkylthiophenylazopyrazolone.

References Cited

UNITED STATES PATENTS

| | | |
|---|---|---|
| 2,131,145 | 9/1938 | Schlack. |
| 2,202,169 | 5/1940 | Schlack. |
| 2,215,196 | 9/1940 | Schlack. |
| 3,186,788 | 6/1965 | Mills et al. |

FOREIGN PATENTS

| | | |
|---|---|---|
| 751,387 | 6/1933 | France. |
| 1,294,409 | 4/1962 | France. |

OTHER REFERENCES

Review of Textile Progress 1962, vol. 14, pages 291–293, pub. 1963 by the Textile Institute, Liverpool, England.

NORMAN G. TORCHIN, Primary Examiner.

U.S. DEPARTMENT OF COMMERCE
PATENT OFFICE
Washington, D.C. 20231

UNITED STATES PATENT OFFICE
CERTIFICATE OF CORRECTION

Patent No. 3,402,012                                                     September 17, 1968

Visvanathan Ramanathan

It is certified that error appears in the above identified patent and that said Letters Patent are hereby corrected as shown below:

Column 8, line 36, "shaft" should read -- salt --.

Signed and sealed this 24th day of February 1970.

(SEAL)
Attest:

Edward M. Fletcher, Jr.                               WILLIAM E. SCHUYLER, JR.
Attesting Officer                                             Commissioner of Patents